United States Patent

Richardson et al.

[11] Patent Number: 5,954,167
[45] Date of Patent: Sep. 21, 1999

[54] FLOW SENSITIVE ACCELERATION SENSITIVE SHOCK ABSORBER WITH ADDED FLOW CONTROL

[75] Inventors: Donald G. Richardson, Sutter Creek; David A. Shirley, Pine Grove, both of Calif.

[73] Assignee: Ricor Racing & Development, L.P., Sutter Creek, Calif.

[21] Appl. No.: 08/795,469

[22] Filed: Feb. 4, 1997

Related U.S. Application Data

[63] Continuation-in-part of application No. 08/396,558, Mar. 1, 1995, Pat. No. 5,823,305.

[51] Int. Cl.$^6$ ................................................ F16F 9/34
[52] U.S. Cl. ............................................................ 188/275
[58] Field of Search ................................. 788/275, 280, 788/281, 282.1, 280.5

[56] References Cited

U.S. PATENT DOCUMENTS

| | | | |
|---|---|---|---|
| 1,281,079 | 10/1918 | Sears . | |
| 2,140,359 | 12/1938 | Hanna | 188/88 |
| 2,252,772 | 8/1941 | Katcher | 280/90 |
| 2,329,803 | 9/1943 | Whisler, Jr. | 188/88 |
| 3,319,741 | 5/1967 | Hauck | 188/275 |
| 3,338,347 | 8/1967 | Avner | 188/88 |
| 3,414,092 | 12/1968 | Speckhart | 188/100 |
| 4,254,849 | 3/1981 | Pohlenz | 188/275 |
| 4,917,222 | 4/1990 | Bacardit | 188/275 |
| 4,953,671 | 9/1990 | Imaizumi | 188/299 |
| 4,958,706 | 9/1990 | Richardson et al. | 188/319 |
| 4,997,068 | 3/1991 | Ashiba | 188/319 |
| 5,332,068 | 7/1994 | Richardson et al. | 188/275 |
| 5,462,140 | 10/1995 | Cazort et al. | 188/275 |

FOREIGN PATENT DOCUMENTS

| | | |
|---|---|---|
| 294846 | 9/1966 | Australia . |
| 1165327 | 10/1958 | France . |
| 1175195 | 3/1959 | France . |
| 1006819 | 3/1983 | Russian Federation . |
| 737486 | 9/1955 | United Kingdom . |
| 794354 | 4/1958 | United Kingdom . |
| 1593258 | 7/1981 | United Kingdom . |
| WO96 27091 | 9/1996 | WIPO . |

*Primary Examiner*—Matthew C. Graham
*Attorney, Agent, or Firm*—Christie, Parker & Hale, LLP

[57] ABSTRACT

An acceleration sensitive shock absorber has a tubular housing and a piston assembly in the housing dividing the housing into an upper chamber and a lower chamber. The piston is connected to the wheel of a vehicle and the housing is connected to the chassis of the vehicle. Fluid can pass between the upper and lower chambers with a restricted flow rate during either extension or compression of the shock absorber. There is a first port for providing fluid flow from the lower chamber to the upper chamber during downward acceleration of the wheel. A movable inertia mass in the piston assembly opens the first port during downward acceleration of the wheel of the vehicle for increasing flow between the chambers. A pocket beneath the inertial mass applies sufficient pressure to the inertial mass to retain it in a port-open position during fluid flow after acceleration has decreased. There is a fluid turning vane for applying sufficient fluid pressure to the inertial mass to maintain the mass in a port-closed position when acceleration of the wheel has decreased or stopped. In addition there is a pressure relief system including a port from the pocket and a pressure relief valve for relieving fluid pressure in the pocket, thus minimizing mechanical noise as the inertial mass moves toward the port-open position.

40 Claims, 7 Drawing Sheets

FLOW SENSITIVE ACCELERATION SENSITIVE SHOCK ABSORBER WITH ADDED FLOW CONTROL

This application is a continuation-in-part of. U.S. application Ser. No. 08/396,558, filed Mar. 1, 1995, now U.S. Pat. No. 5,823,305 the subject matter of which is hereby incorporated by reference.

This invention relates to vehicle shock absorbers which are typically mounted between the wheels and chassis or body of an automobile, truck, motorcycle, etc. The invention relates to a shock absorber with damping characteristics that change depending upon the acceleration of parts of the shock absorber, most importantly, during downward acceleration of the vehicle wheel. More specifically, it relates to the control of fluid flow for movement of an inertia valve in the shock absorber. Shock absorbers may also be referred to as dampers, particularly in Europe where that term is almost universally used.

Hydraulic shock absorbers are universally employed in automotive vehicles. Each wheel of the vehicle is coupled to the vehicle chassis or frame by a spring so that bumps or dips in the road are not transmitted directly to the passengers or vehicle load. A spring alone, however, would still give a rough ride. Shock absorbers are therefore mounted in parallel with the springs to damp the accelerations applied to the chassis from the wheel.

Most shock absorbers are designed to have a certain operating characteristic or load-velocity curve which is a compromise of the characteristics desired for a variety of road conditions. The characteristics suitable for driving on relatively smooth road may, however, be inappropriate where the vehicle wheels may encounter short range bumps or dips.

Shock absorbers which respond to accelerations of a vehicle wheel are known in the art. One such method implemented in a standard cylinder—piston arrangement allows dynamic adjustment of valves and orifices to control the flow of hydraulic fluid from one end of the cylinder to the other end through the piston in response to terrain defects.

Such acceleration sensitive shock absorbers have demonstrated a remarkable ability to improve the performance of vehicles equipped with such shock absorbers, and applicant has developed an improved acceleration sensitive shock absorber having a movable inertia valve for opening a port during downward acceleration of the vehicle wheel. The acceleration sensitive shock absorber further includes means for biasing the inertia valve towards its open position in response to fluid flow through the shock absorber. The acceleration sensitive shock absorber also provides a means for closing the port with the inertia valve as soon as the flow in the port ceases.

As the inertia valve moves to a port-open position, fluid exits ports into the piston annulus and against the inertia valve. The fluid momentum can impart too much kinetic energy into the inertia valve, creating high inertia valve velocities as the inertia valve moves toward its port-open mechanical stop which creates unacceptable noise levels in the shock absorber.

It is also desirable to apply a spring load to the inertia valve in the shock absorber to reduce the effects of gravity. Ideally, the inertia valve is a pure inertial element unaffected by gravity. As the inertia valve approaches a weightless condition, the more sensitive it becomes to acceleration inputs. A problem with pressure sensitivity exists when a high spring load is exerted on the inertia valve to counteract the effects of gravity. A "weightless" inertia valve also becomes sensitive to pressure differentials during non-inertia valve extension events or body motion events. Body motion events create high pressure inside the piston as fluid is metered through the body motion valving. Due to clearances from manufacturing tolerances in the assembly, high pressure fluid can act on the inertia valve, making it pressure sensitive. An undesirable result is that fluid pressure can move the inertia valve to a port-open position during body motion events which leads to a reduction in rebound damping force when high rebound forces are necessary to control vehicle body motions.

Consequently, a need exists for a flow sensitive, acceleration sensitive shock absorber with added flow controls to eliminate the problems of unacceptable noise levels created from high inertia valve velocities as the inertia valve moves towards its port-open mechanical stop, and pressure sensitivity problems associated with high spring loads on the inertia valve to reduce the effects of gravity.

SUMMARY OF THE INVENTION

There is, therefore, provided in practice of this invention a flow sensitive, acceleration sensitive shock absorber with added flow controls for minimizing noise levels created by opening of the inertia valve, and for controlling the pressure sensitivity effects on the inertia valve when spring loaded to overcome the effects of gravity. Two stage operation is also provided for low and high accelerations, respectively. The shock absorber includes a tubular housing and a piston assembly in the housing, dividing the housing into an upper chamber and a lower chamber. The shock absorber further includes a port for increasing fluid flow between the chambers and a movable inertia valve for opening the port during downward acceleration of the vehicle wheel. The shock absorber further includes means for biasing the inertia valve towards its open position in response to fluid flow from the lower chamber to the upper chamber and a means for closing the port with the inertia valve as soon as the flow through the port ceases. In a preferred embodiment, the inertia valve is mounted in the piston assembly for normally keeping the port closed and opening the port during extension of the shock absorber. The port is kept open by having a first restricted area flow path downstream of the port when the port is open. The port is closed by having a lip formed on the inertial valve adjacent a shoulder that defines a pocket in the piston annulus which has a passage leading to the lower chamber. By this means, a downward force is exerted on the inertial valve during fluid flow from the upper chamber to the lower chamber.

A reed valve system is incorporated adjacent the piston to dissipate enough fluid momentum energy to reduce inertia valve noise to an acceptable level. The reed valve system comprises passages formed in the piston to connect the pocket in the piston annulus to the upper chamber of the shock absorber. Each of these passages is covered by a reed valve and a retainer to limit travel of the reed valve. The reed valves are pressure relief valves that provide an alternate path for fluid exiting the pocket in the piston annulus. The result is less energy imparted to the inertia valve, which reduces the associated mechanical noise.

To overcome the effects of pressure sensitivity created by applying a spring load to the inertia valve to reduce the effects of gravity, a fluid turning vane is positioned over the piston for diverting the flow of fluid during body motion events. The fluid turning vane vectors the fluid back towards the inertia valve or into a counterbore in the inertial member of the inertia valve for maintaining the valve in a port-closed position during body motion events. The fluid momentum forces created during body motion events are enough to overcome the pressure sensitive forces trying to move the inertia valve to a port-open position. The result is that the inertia valve can be highly spring-preloaded towards a weightless condition unaffected by pressure sensitivity.

The port of the inertia valve has two stages, with a smaller opening of the port upon lower acceleration and larger opening of the port upon higher acceleration. This provides two levels of changes in damping characteristics for different wheel motion events.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
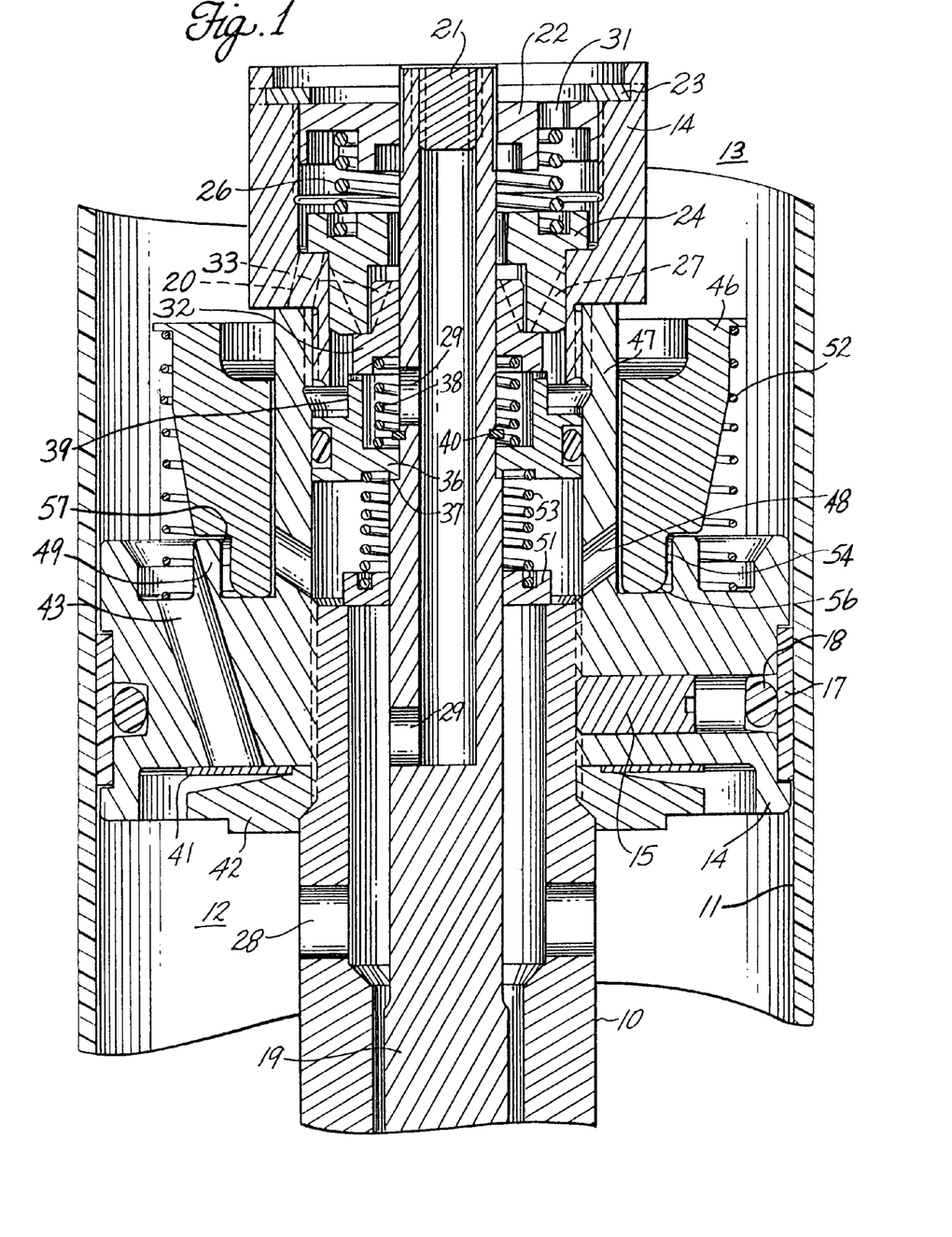
FIG. 1 is a fragmentary longitudinal cross-section of an acceleration sensitive shock absorber when there is no acceleration of the vehicle wheel.
Figure 2:
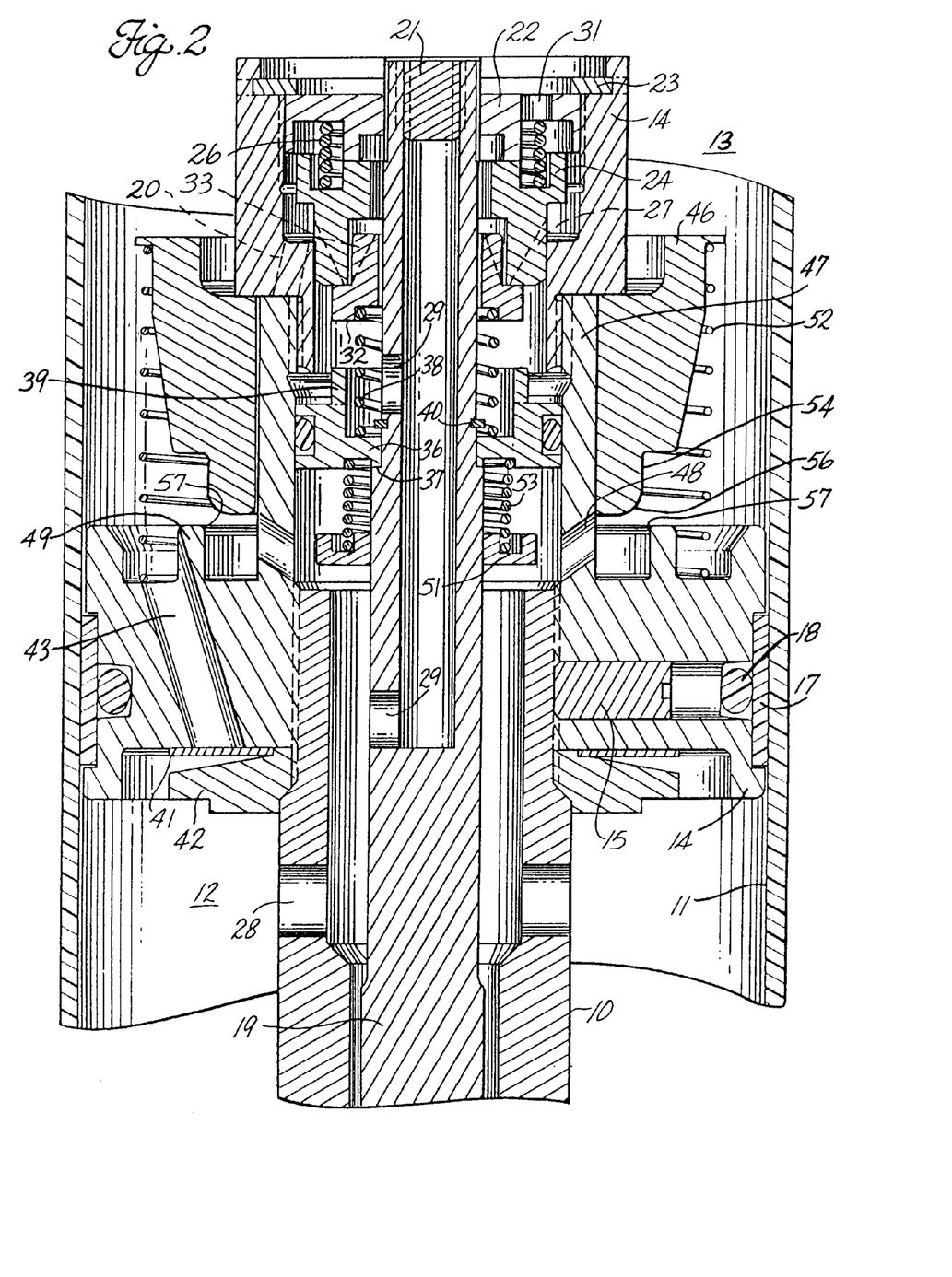
FIG. 2 is a fragmentary longitudinal cross-section of the shock absorber of FIG. 1 when the vehicle wheel is accelerating downwardly and an acceleration sensitive valve has opened.

The first two drawings illustrate a piston assembly of a single tube shock absorber which is acceleration sensitive and flow sensitive. The piston assembly is on a piston rod 10 connected to the wheel (not shown) of a vehicle. The piston assembly is mounted in the hollow cylindrical body 11 of the shock absorber, which is connected to the frame or chassis (not shown) of the vehicle. The piston assembly divides the interior of the cylinder 11 into a lower chamber 12 below the piston and an upper chamber 13 above the piston. The rest of the shock absorber, including means for connecting to the vehicle is conventional and need not be illustrated for an understanding of this invention.

It will be understood that references are made to an upper chamber and a lower chamber, since this is the way the shock absorber is normally mounted in a vehicle. In other embodiments, such as a twin tube shock absorber, the shock absorber may be inverted with a tube connected to a vehicle wheel and a piston rod connected to a vehicle chassis. Details of the operative structure differ accordingly. When mounted as illustrated, movement of the piston assembly downwardly occurs during extension of the shock absorber such as, for example, when the wheel moves away from the vehicle as the terrain drops away beneath the vehicle or the wheel rebounds from compression. Alternatively, upon compression of the shock absorber, the piston assembly moves upwardly within the cylinder.

The piston assembly has a hollow piston 14 threaded onto the upper end of the hollow piston rod 10. A set screw 15 prevents the piston from unscrewing from the piston rod. A hollow inertia valve retainer 16 is threaded into a smaller diameter end of the piston. A set screw (not shown) in a diagonal hole 20 in the inertia valve retainer bites into the end of the piston to prevent the retainer from unscrewing from the piston. The perimeter of the piston is sealed to the inside of the cylinder by a circumferentially extending scarf-cut wear band 17 made of polytetrafluoroethylene or the like. The wear band is backed up by an O-ring 18 which acts as a "spring" for biasing the wear band against the inside of the cylinder.

An adjustment rod 19 extends through the hollow piston rod and piston. The upper end of the adjustment rod is hollow and is closed by a threaded plug 21. The exterior of the upper end of the adjustment rod is hexagonal and fits in a hexagonal hole of a rebound adjuster 22 which is held in the inertia valve retainer by a snap ring 23. An annular rebound valve 24 has a larger diameter portion that seats against a shoulder inside the inertia valve retainer and is biased against the shoulder by a rebound spring 26. There are four diagonally extending slots 27 in the outside of a reduced diameter portion of the rebound valve.

During extension or rebound of the shock absorber the piston moves downwardly in the cylinder, raising the pressure in the lower chamber and decreasing pressure in the upper chamber. This causes fluid to flow through radial openings 28 in the piston rod and additional radial openings 29 communicating with the hollow interior of the adjustment rod. The increased fluid pressure against the rebound valve 24 moves the valve upwardly against the rebound spring, moving the diagonal slots 27 past the shoulder in the retainer so that fluid can flow past the valve and through holes 31 through the rebound adjuster at the upper end of the piston assembly.

As mentioned above, the end of the adjustment rod 19 is hexagonal and fits in a hexagonal hole in the rebound adjuster. The rebound adjuster is threaded into the inertial valve retainer. Thus, rotation of the adjustment rod can move the rebound adjuster longitudinally in the threads. This changes the force on the rebound spring and hence the opening force of the rebound valve. The adjustment rod extends through the lower end of the shock absorber for adjustment of the rebound characteristics of the shock absorber.

An annular compression valve 32 fits around the adjustment rod and has a shoulder which seats against the end of a smaller diameter portion of the rebound valve 24. A smaller diameter portion of the compression valve fits within a portion of the rebound valve. The smaller diameter portion of the compression valve has diagonally extending slots 33 on the outside surface facing toward the inside of the rebound valve. The compression valve is biased toward the closed position against the rebound valve by a compression spring 34. The other end of the compression spring bears against a compression adjuster 36 which fits onto the adjustment rod and seats against a shoulder 37. The compression adjuster is captive between that shoulder and a snap ring 40.

Four longitudinal extensions 39 on the compression adjuster are positioned for engagement with the bottom of the compression valve. When the adjustment rod is in its fully up position the extensions actually bear against the end of the compression valve and prevent it from opening. This provides the maximum stiffness of the shock absorber in compression. This adjustment also changes the travel of the compression valve. When the adjustment rod is moved downwardly, the extensions are spaced away from the end of the compression valve 32 so that the valve can open. Typically, a longitudinal travel of 2.5 millimeters is appropriate for adjustment to the softest desired compression resistance. Thus, the compression adjuster sets both the compression opening force for the compression valve and the travel of the valve. The limitation on travel of the valve regulates the amount of opening of the slots 33 and meters the quantity of fluid that can flow through the compression valve.

The adjustability feature of the shock absorber is optional and may be deleted with adjacent parts fixed together or made integral with suitable openings, etc. of dimensions that give desired performance characteristics.

In the event of the vehicle hitting a bump, for example, so that the shock absorber is compressed, the fluid pressure in the upper chamber 13 becomes greater than the pressure in the lower chamber. Shock absorber fluid flows through the holes 31 in the rebound adjuster, through the center hole of the rebound valve 24, through the slots 33 in the compression valve, through openings (not shown) between the extensions 39 on the compression adjuster, through the radial holes 29 in the hollow end of the adjustment rod, and through the openings 28 through the piston rod into the lower chamber.

The compression spring 34 biasing the compression valve 32 against the rebound valve 24 has a sufficient travel that it keeps the compression valve closed even when the rebound valve moves toward its open position. The pressure from the lower chamber during rebound also helps keep the compression valve closed. The rebound spring 26 has a higher spring constant than the compression spring 34 so that when there is no pressure differential across the piston assembly the rebound valve remains closed against the shoulder in the inertia valve retainer and the compression valve remains closed against the end of the rebound valve.

The edge of the shoulder in the inertia valve retainer cooperates with the diagonal slots 27 in the rebound valve to meter the flow through the valve during the rebound or extension stroke of the shock absorber. As the rebound valve moves away from the shoulder as pressure in the lower chamber increases, the slots progressively open and more fluid can flow through the valve.

Similarly, the smaller diameter end of the rebound valve cooperates with the diagonal slots 33 in the compression valve to meter flow during the compression stroke of the shock absorber. When the compression valve is in its maximum nested or embedded position inside the rebound valve, the slots 33 are completely closed and no fluid flows through the valve. As the compression valve moves out of its nested position, the area of the slots through which fluid can flow progressively increases. The limitation on travel of the compression valve before encountering the extensions 39 on the compression adjuster determines the maximum flow rate of fluid and the compression stiffness of the shock absorber. If desired the slots can be provided inside the rebound valve.

It is also desirable to have a "blow off" of pressure in the event of rapid compression of the shock absorber. For this purpose there is a conventional deflected disk valve 41 held in place against the bottom of the piston by a disk retainer 42. In the event of substantially increased pressure in the upper chamber, fluid flows through diagonal passages 43 through the piston and pops the deflected disk valve open to permit direct fluid flow from the upper chamber to the lower chamber.

An important feature of the shock absorber is acceleration sensitivity. This is provided by a somewhat massive inertia valve member 46 which fits closely around a smaller diameter longitudinal extension 47 of the piston. There is a close fit between the outside diameter of the piston extension and the inside diameter of the inertia valve member for minimizing fluid leakage when the valve is closed. For example, the diametrical clearance is about 60 to 65 micrometers.

There are generally radially extending ports 48 through the piston extension adjacent to the inside surface of the inertia valve member 46 when it is closed as illustrated in FIG. 1. In the illustrated embodiment the ports are machined diagonally through the wall of the extension 47 to avoid interference during machining with a circumferentially extending rib 49 on the upper end of the piston. In an exemplary embodiment there are four such ports, each with an area of 20 mm$^2$, or a total flow area through the ports of 80 mm$^2$.

In the event of downward acceleration of the wheel to which the piston rod is attached, the piston accelerates downwardly. Because of the inertia of the inertia valve member, it tends to remain at a fixed location in space and the piston moves away from it. Upon sufficient acceleration the inertia valve member can move upwardly (relative to the piston) until it engages the inertia valve retainer 14. When it moves to this upward or open position as illustrated in FIG. 2, the lower portion of the inertia valve member no longer obstructs the ports through the piston. Fluid from the lower chamber can therefore flow through the radial ports 28 in the hollow piston rod, through a check valve 51, and through the ports 48 into the upper chamber.

Thus, when the downward acceleration of the wheel exceeds some selected magnitude, the inertia valve is completely opened to permit relatively rapid fluid flow from the lower chamber to the upper chamber. This, of course, reduces the resistance to extension of the vehicle spring and wheel, permitting the wheel to travel downwardly rapidly and maintain engagement with the road surface.

The check valve 51 is biased closed by a relatively light spring 53. The check valve permits flow from the lower chamber to the upper chamber when the ports 48 through the piston are opened by upward displacement of the inertia valve member. The check valve, however, closes quickly and prevents reverse flow in the event of compression before the inertia valve member is completely closed.

It has been found desirable to maintain the inertia valve in an open position (as illustrated in FIG. 2) even after acceleration has diminished. A restricted flow path is therefore provided downstream from the ports 48 controlled by the inertia valve member for hydraulically biasing the inertia valve member toward its open position as fluid flows from the lower chamber to the upper chamber.

This restricted flow path is provided by a small annular clearance between the inside diameter of the rib 49 and the circumferential outside surface 54 on the inertia valve member. When the inertia valve is completely closed as illustrated in FIG. 1, an exemplary clearance between the inside of the rib and the outside of the inertia valve member is as low as 0.6 millimeter. The relative areas and spacings of the ports 48 and the restricted flow path between the rib and inertia valve member are such that the restricted flow path has a smaller area than the ports when the ports are open, except for a short distance when the ports are almost closed.

The outside edge of the lower end of the inertia valve member has a radius 56, and there is a radius 57 on the inside of the top of the rib on the piston. The restricted flow path for flow control downstream from the ports has an area controlled by the clearance between the rib and inertia valve member until near the upper end of the travel of the inertia valve member when the two radii begin to enlarge the distance between these members, and the flow area increases. Even when fully open as illustrated in FIG. 2, the flow area through the restricted flow path between the radii 56 and 57 is less than the flow area through the ports. Conversely, when the inertia valve starts to close, the area of the restricted flow path decreases for part of the stroke and then remains essentially constant for the rest of the stroke.

As the inertia valve member moves from its open position toward its closed position the pressure in the space between the end of the inertia valve member and the piston face increases while fluid is flowing through the ports and restricted flow path from the lower chamber to the upper chamber. The increased pressure retards closing of the valve, thereby permitting rapid flow of fluid for a longer period.

Figure 3:
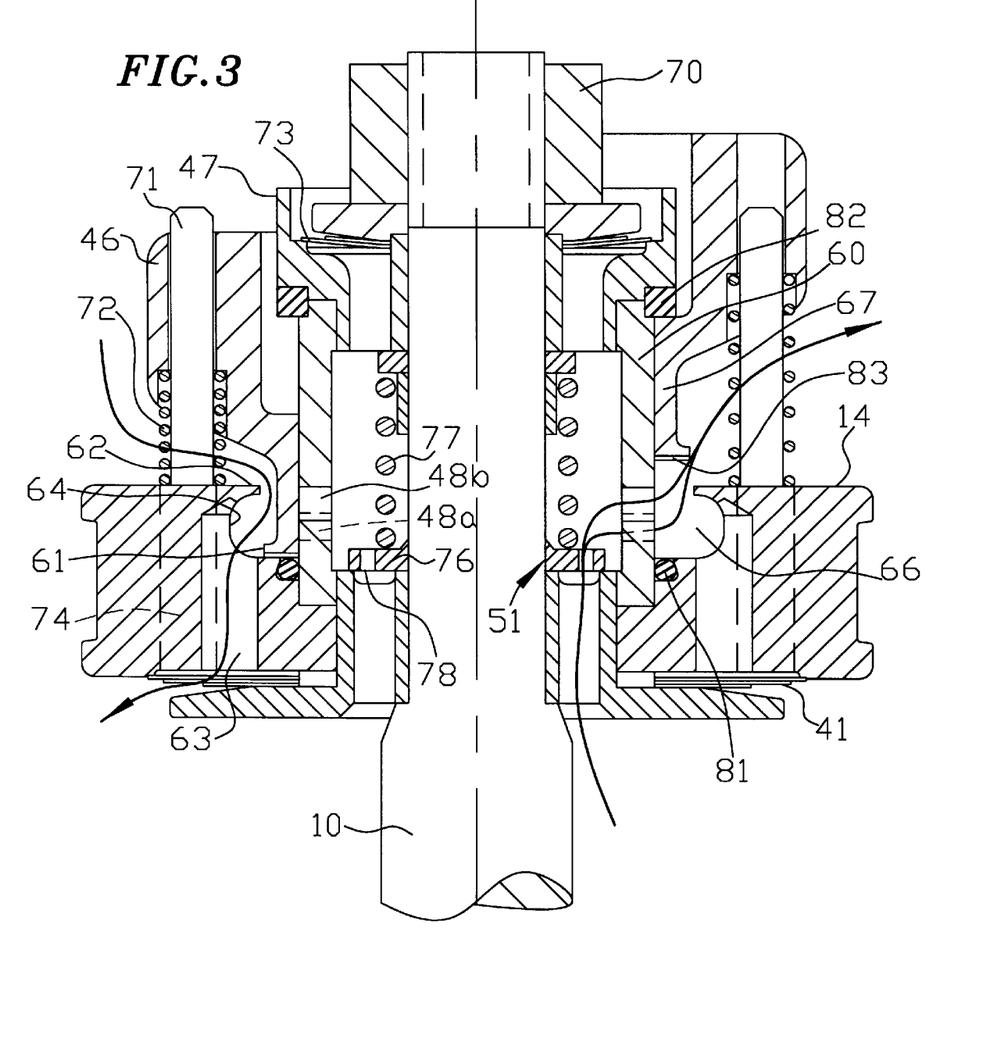
FIG. 3 is a fragmentary longitudinal cross-section of a piston assembly for an acceleration sensitive shock absorber where the left side of the drawing depicts the shock absorber when there is no acceleration of the vehicle wheel, and the right side of the drawing depicts the shock absorber during downward acceleration of the wheel.

FIG. 3 is a fragmentary longitudinal cross-section of the piston and inertia valve of another embodiment of acceleration sensitive, fluid flow sensitive shock absorber which includes means for rapidly closing the inertia valve upon reverse flow occurring. A portion of the structure illustrated in FIG. 3 is the same as hereinabove described and illustrated in FIGS. 1 and 2. The same reference numerals are therefore employed to designate the parts. FIG. 3 differs from FIGS. 1 and 2 by illustrating in the left portion of the drawing the shock absorber when there is no acceleration of the vehicle wheel in the downward direction and the right side of the drawing illustrates the shock absorber during downward acceleration of the vehicle wheel.

In this illustration as well as for FIGS. 4, 6 and 8 subsequently described, part of the structure of the piston assembly is deleted, since not required for an understanding of the invention. Any such omitted structure is similar to what is disclosed in FIGS. 1 and 2.

Thus, what is illustrated in FIG. 3 is a piston 14 on a piston rod 10. Instead of having a sleeve 47 integral with the piston, there is an intermediate sleeve 60 between the piston and the longitudinally extending upper sleeve. These parts are held to the piston by a nut 70 threaded on the rod. An inertial mass 46 mounted on the piston is also illustrated in FIG. 3. Guide pins 71 on the piston hold coil springs 72 which offset part of the weight of the inertial mass to expedite opening of the inertia valve.

There is a deflected disk valve 41 on the bottom face of the piston and another deflected disk valve 73 at the top of the piston assembly. The upper disk valve 73 has deflection characteristics suitable for damping chassis or body motion imposed on the shock absorber.

In the embodiment illustrated in FIG. 3, the restricted fluid flow path downstream from the fluid ports 48 is provided by a small annular clearance between the bottom edge or lip 61 of the inertial valve 46 and a shoulder portion 62 on the piston 14, when the inertia valve is open. The relative areas and spacings of the ports 48 and the annular restricted flow path are such that the restricted flow path has a smaller area than the ports when the inertia valve is open. Thus, when the inertia valve is open, the cross-sectional area for fluid flow through the restricted flow path is less than the cross-sectional area for fluid flow through the ports.

Because of this restricted flow path downstream from the ports, there is a higher pressure below the inertia valve member 46 than there is in the upper chamber 13. This hydraulic pressure differential due to the restricted flow path biases the acceleration sensitive inertia valve 46 toward its open position. This upward bias continues as long as there is fluid flow, even after acceleration has concluded. The inertial member has sufficient stroke beyond the initial port-open position that the lip 61 travels beyond the shoulder 62 on the piston.

When the inertial mass is moved upwardly relative to the piston due to acceleration, and is retained in its uppermost position by fluid flow, the lower edge 61 of the inertial mass is above the shoulder 62 on the piston and the cross-sectional area of the flow path is larger than when the edge and shoulder are immediately adjacent each other. This minimizes back pressure inhibiting free flow of fluid through the ports. As flow continues even after acceleration has concluded, the inertial member "floats" at some position where the lip is above the shoulder. When flow stops, the inertial member can move downwardly toward the port-closed position. Thus, as the inertia valve begins to descend from its maximum upward displacement, the flow area of the restricted flow path decreases, resulting in increased pressure below the inertial mass. Such increased pressure retards closing of the inertia valve, thereby permitting rapid flow of fluid from the lower chamber to the upper chamber for a longer period.

There are two sets of fluid flow ports 48a and 48b for fluid flow from the lower chamber into the pocket below the inertial member. Upon lower acceleration, the inertial member may be moved a small distance above the piston, opening the lower ports 48a and leaving the upper, somewhat larger ports 48b closed. There is partial bypassing of fluid through the lower ports, making the shock absorber somewhat softer. The lip 61 on the inertial member is below the shoulder 62 on the piston and fluid can follow a path through the undercut 64 in the piston, around the lip 61 and past the shoulder 62 through a relief 67 in the inertial mass.

During this "stage one" effect, the flow area downstream from the first stage ports 48a is larger than the area of the ports and fluid flow does not cause appreciable pressure increase in the pocket below the lip 61 and shoulder 62. Thus, upon low accelerations of the rod and piston, the inertia valve opens and remains open by acceleration effects only. The valve opening is effectively insensitive to fluid flow. The first stage bypass via an inertia valve has been found effective in minimizing freeway hop. An exemplary embodiment may have six stage one holes 48a, each with a diameter of about 1.5 mm.

During larger acceleration the inertial mass moves further; the "stage two" upper ports 48b also open and the lip and shoulder are near each other, permitting a larger volume fluid flow after the inertial member has moved most of the way to its full port-open position. There is some additional opening force near the end of the stroke of the inertial mass, which occurs only after acceleration has caused the valve to open. Duration of opening is primarily what is controlled during the second stage since fluid pressure in the pocket tends to keep the valve open after acceleration has stopped.

By varying the longitudinal extents and locations of the lip and shoulder, the sizes of the ports and width of the annulus between the lip and shoulder, the force on the inertial member can be tailored within wide ranges to provide a suitable duration that the inertial valve remains open to obtain good shock absorber performance for a given vehicle type. In one embodiment, eighteen second stage holes 48*b* are employed, each with a diameter of 2.2 mm. The flow area through the annulus between the lip and shoulder is smaller than the flow area through all of the ports 48.

It has been found to be desirable to rapidly close the inertia valve in the event of compression before the inertia valve is completely closed. In the event of increased pressure in the upper chamber, fluid flows through relief passages 63 through the piston and pops the deflected disk valve 41 open to permit direct fluid flow from the upper chamber to the lower chamber.

The relief passages do not communicate directly from the upper chamber, as described and illustrated in FIGS. 1 and 2. Instead these passages terminate in an annular internal undercut portion 64 in the piston below the shoulder. This undercut region and the lower end of the inertial mass form a pocket 66 between the ports 48 and the downstream annular restricted flow path.

It has been found that fluid in this pocket tends to retard closing of the inertia valve. Such fluid cannot quickly flow back directly to the lower chamber because of a check valve 51 in a return path through the ports and must pass through the flow restrictive annular space between the lip and shoulder. The pocket of fluid can inhibit the return of the inertial mass to its closed position. By having the relief passages 63 connect between the lower chamber and the pocket, fluid can be removed rapidly from the pocket and the inertia valve can close quickly.

The check valve 51 is in series with the ports, permitting upward flow and restricting downward flow. The check valve comprises a valve disk 76 biased downwardly by a coil spring 77. A number of holes 78 permit some flow through the disk. The spring rate, spring constant and hole areas can be adjusted to obtain desired rebound tuning of wheel motion damping for a particular model of vehicle. From three to eight holes, each about 1.5 mm diameter have been found suitable.

Furthermore, increased hydraulic pressure in the upper chamber relative to the pocket beneath the inertial mass when the inertial mass is in its elevated position, produces a large closing force against the inertial mass, driving it towards its closed position. This force is relatively large while the lower edge of the inertial mass is adjacent the shoulder and the annular space is small. The force decreases as the inertial mass moves downwardly and fluid flows from the upper chamber to the relief passages 63 through an annular relief 67 above the lower lip 61 on the inertial mass. The annular relief permits a larger volume of fluid flow than when the restricted flow path is small.

The diversion of fluid around the lip, as well as continued higher pressure in the upper chamber, continues to bias the inertia valve towards its closed position.

A portion of the fluid is passed from the pocket below the inertial mass to the lower chamber by way of the relief passages 63, and another portion is passed directly from the upper chamber to the lower chamber through passages 74 and the lower disk valve 41. Changing the proportions of these flows is an added way for adjusting the speed of closing of the valve.

It has been found that such an arrangement for quickly closing the inertia valve significantly enhances performance of the shock absorber. The valve operates so quickly that it can be heard as the inertial mass strikes the adjacent parts at the end of its stroke. This metal-to-metal impact noise is minimized by placing an elastomeric buffer so as to engage each end of the inertial mass at the ends of its stroke. Even a thin cushion can noticeably reduce the noise. An O-ring 81 is placed in a groove adjacent the bottom of the inertial mass as a buffer. A square cross-section elastomeric ring 82 is provided adjacent the upper end of the stroke of the inertial mass to avoid metal-to-metal contact upon inertia valve opening. It is found that with an O-ring at the bottom, a seal is formed against the bottom of the inertial mass when the inertia valve is closed. This sealing can inhibit rapid action of the valve. To minimize any such effect, radial grooves 83 are formed in the bottom of the inertial mass to interrupt the otherwise flat surface and avoid a seal to the O-ring.

Figure 8:
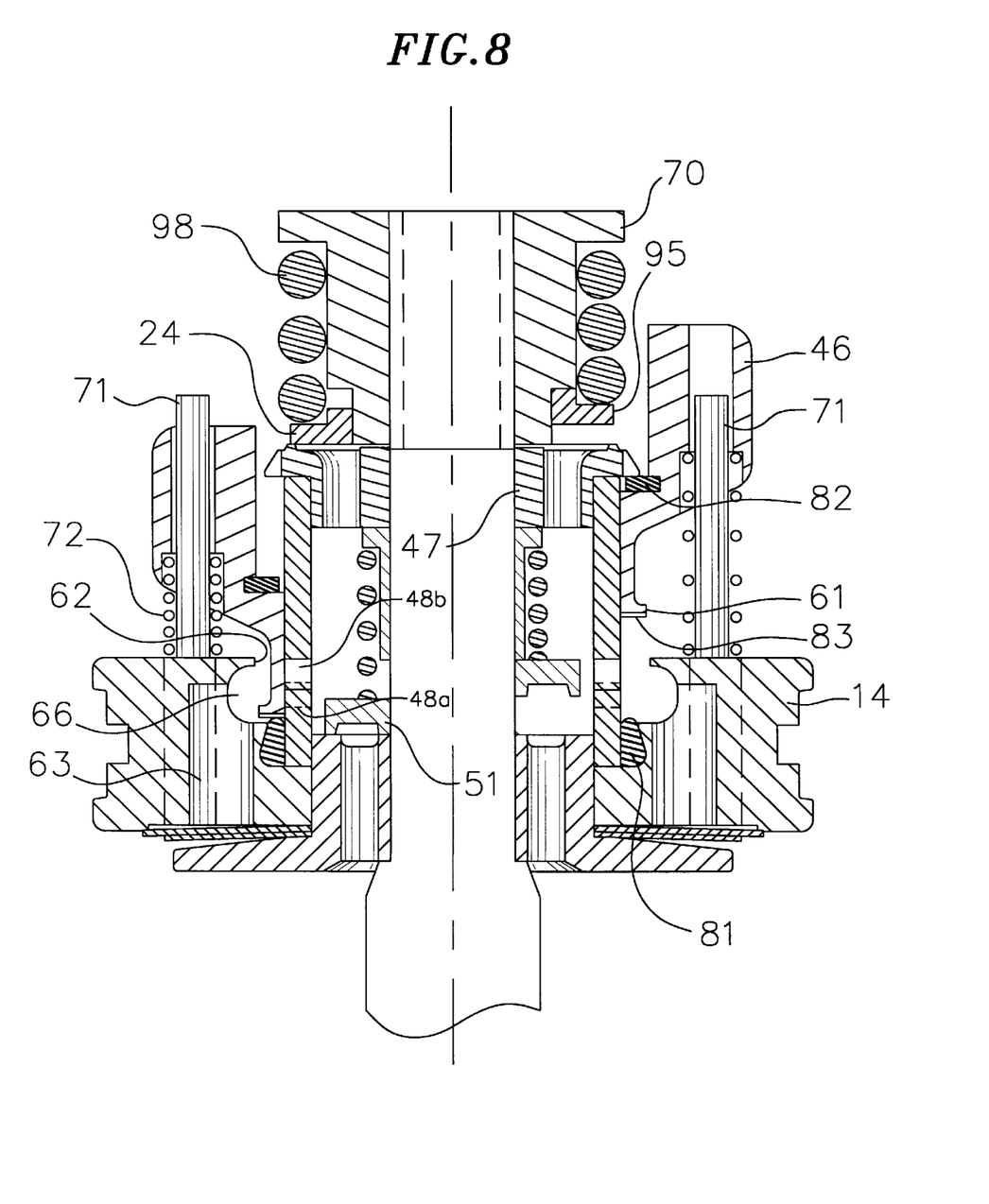
FIG. 8 is a fragmentary longitudinal cross-section of another embodiment of piston assembly for a shock absorber.

FIG. 8 illustrates another embodiment of acceleration sensitive, flow sensitive shock absorber with a slightly different configuration of the elastomeric buffer below the inertial mass 46. In this embodiment the elastomeric buffer 81 is in a groove having what can be characterized as a half of a dovetail cross section. The buffer is molded to have a cross section matching that of the dovetail groove to minimize the possibility of it being ejected from the groove. The upper portion of the buffer extending above the surface of the piston is rounded similar to an O-ring surface.

It is found that the elastomeric buffer is important for proper operation of the shock absorber in addition to minimizing mechanical noise. It is desirable that the area of contact between the bottom of the inertial mass and the piston be small to minimize any tendency of the inertial mass to "stick" to the piston as fluid flows into the space between the inertial mass and the piston upon lift-off of the mass from piston. The rounded top of the elastomeric buffer provides such a small area. Furthermore, radial grooves in the bottom of the inertia valve further minimize the area and potential for sticking. The grooves also serve an additional function. Due to manufacturing tolerances, small leakage may occur through the ports 48 and build up pressure under the inertial mass, leading to premature opening of the inertia valve. The grooves avoid a seal to the elastomeric buffer and permit any such leakage to drain, thereby avoiding this potential problem.

FIG. 8 also illustrates another arrangement for an elastomeric buffer for the upper end of the stroke of the inertia valve. In this embodiment, the buffer comprises a rectangular elastomeric ring 82 mounted in a circumferential groove in a counterbore in the inertia valve 46. At the upper end of the stroke, the buffer engages an outwardly extending lip on an inertia valve retainer 47. A buffer in this location is not in line with any rapidly flowing fluid and is less likely to be displaced than the ring 82 in the embodiment of FIG. 3.

Figure 4:
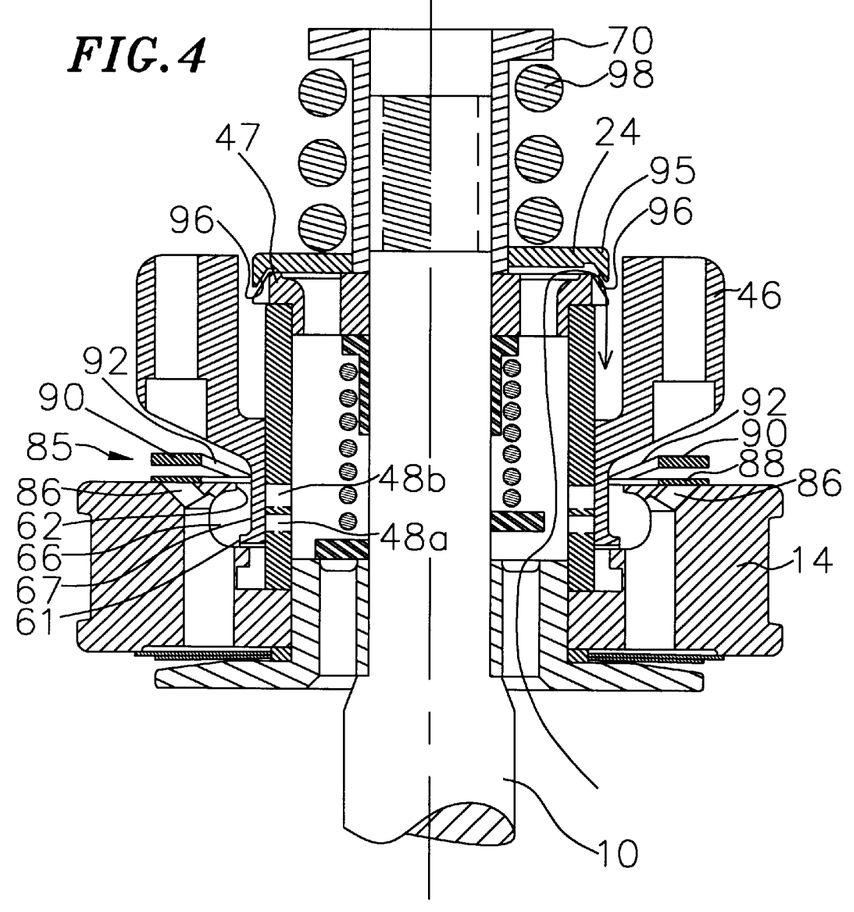
FIG. 4 is a fragmentary longitudinal cross-section of a piston assembly for an acceleration sensitive shock absorber incorporating a dynamic fluid turning vane and a pressure relief valve for the inertia valve where the right side of the drawing depicts the fluid flow path past the dynamic fluid turning vane.

FIG. 4 illustrates an alternative means for minimizing the mechanical noise associated with the inertia valve 46 striking the longitudinally extending upper sleeve 47 which acts as an inertia valve retainer. As the inertia valve moves from its port-closed position toward its port-open position the fluid exits ports 48*a* and 48*b* into the pocket 66 and piston annulus 67 and against the inertia valve, eventually exiting to the upper chamber of the shock absorber through the annulus created by the lip 61 and shoulder 62. The fluid momentum during this flow imparts considerable kinetic energy into the inertia valve, creating high inertial mass velocities as the inertia valve moves towards the upper sleeve.

Figure 5:
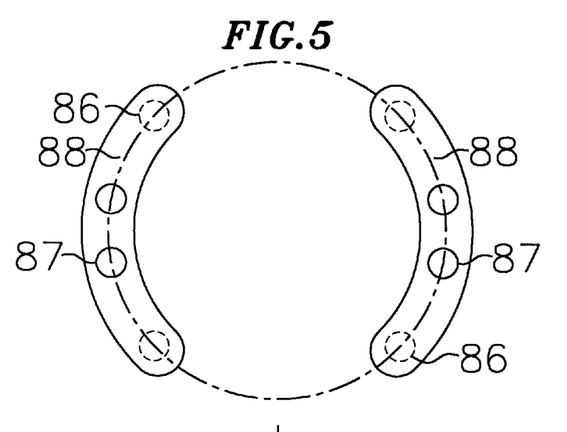
FIG. 5 is a fragmentary top view of the pressure relief valve of FIG. 4.

To minimize the noise level, a reed valve system 85 is incorporated into the shock absorber to relieve fluid pressure in the piston annulus as the inertia valve moves toward the port-open position. The reed valve system comprises four passages 86 formed into the piston which connect the pocket and piston annulus to the upper chamber above the piston. The passages are covered by reed valves 88, which, as seen in FIG. 5 are arcuate-shaped valves which are positioned on the upper surface of the piston around a portion of the inertia valve annulus. Each "banana-shaped" valve is held in place by a pair of rivets or screws 87 and has ends covering each of two passages 86, respectively. The reed valve is typically 0.12 millimeters to 0.2 millimeters thick.

To resist fatigue of the reed valve, a reed valve retainer 90 is positioned above the reed valve to limit vertical deflection of the reed valve. The reed valve retainer is also arcuate in shape and includes an angled portion 92 to create a gap between the reed valve and the retainer. The retainer is typically 0.635 millimeters thick and is positioned directly over the reed valves around the annulus of the inertia valve. The retainer is also held in places by rivets or screws 87.

The reed valve is a pressure relief valve that provides an alternate path for fluid exiting the piston annulus. The result is that less energy is imparted to the inertia valve member, which reduces mechanical noise associated with movement to the port-open position. The fluid pressure required for the reed valve to operate is above the pressure that is required to maintain the inertia valve in a port-open position. The reed valve does not relieve fluid pressure at sufficiently low fluid pressures to affect the inertia valve flow sensitivity. The upper limit of fluid pressure for the reed valve is that which dissipates enough fluid momentum energy to reduce inertia valve noise to an acceptable level. The fluid pressure necessary to operate the reed valve can be altered by changing the size of the passages through the piston, which would alter the effective working surface area on the reed valve, as well as reed valve thickness and spring constant.

Figure 6:
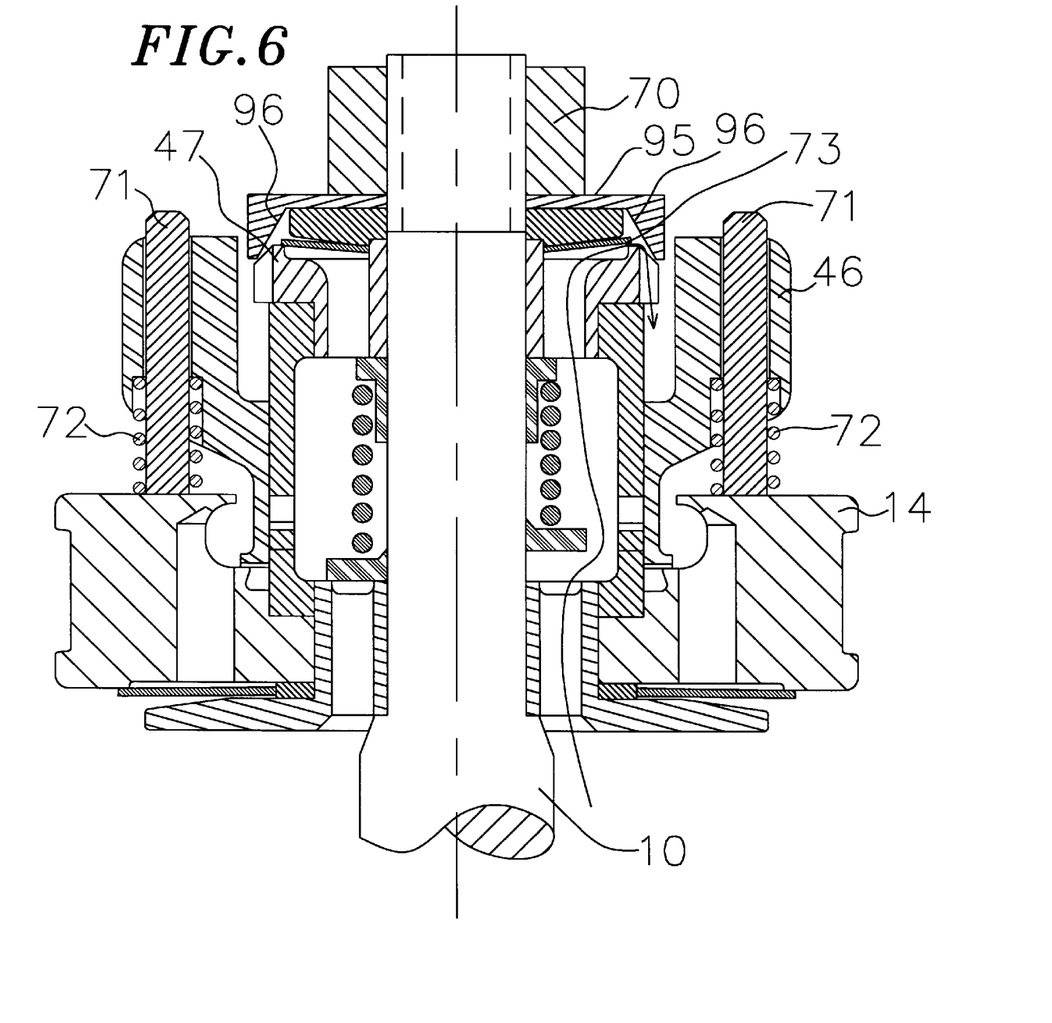
FIG. 6 is a fragmentary longitudinal cross-section of the piston assembly of FIG. 3 incorporating a static fluid turning vane for a spring loaded inertia valve where the right side of the drawing depicts the fluid flow path past the static fluid turning vane.

The shock absorbers of FIGS. 4 and 6 include guide pins 71, positioned on the piston 14, and coil springs 72 around the guide pins between the piston and the inertia valve 46 to apply a spring load to the inertia valve to reduce the effects of gravity. The coil springs ideally counteract the gravity force of the inertia valve to suspend the inertia valve in a substantially weightless condition. This permits the inertia valve to open upon very low acceleration of the wheel. The guide pins and coil springs have been omitted from FIG. 4 for clarity so that the reed valve system could be clearly illustrated. Similarly, the reed valve system has been omitted from FIG. 6 so that the guide pins and coil springs could be clearly illustrated.

As the inertia valve approaches a weightless condition it becomes more sensitive to acceleration inputs to the piston and fluid flow through the shock absorber. Because the inertia valve becomes more sensitive to fluid pressure effects, such as during automobile body movements, a fluid turning vane 95 is positioned above the rebound retainer sleeve 47. The fluid turning vane vectors the exiting fluid from the body motion valving towards the inertia valve to apply sufficient fluid force on the inertia member to maintain the valve in a port-closed position during body or chassis motion events.

The fluid turning vane of FIG. 4 is formed integrally with a rebound valve 24. The fluid turning vane is a disk positioned around threaded nut 70 and has a machined angled surface 96 for directing the fluid approximately 180° from its intended direction of travel during body motion events. The fluid turning vane is dynamic in that fluid forces the rebound valve upwardly against a coil spring 98 held between the rebound valve and an upper lip of the nut 70. The fluid is then directed around the rebound valve retainer sleeve 47 and towards the inertia valve.

The fluid turning vane 95 of FIG. 6 is static and is also a disk located around the piston rod 10 above the deflected disk valve 73. The turning vane is held rigidly against the deflected disk valve by a nut 70. The fluid turning vane includes a machined angled surface 96 which turns the fluid approximately 180° toward the inertia valve as it exits the deflected disk valve.

FIG. 8 illustrates a variation of the turning vane that has much less effect on the inertia member than the vane 95 illustrated in FIG. 4. It is found in some embodiments that a vane that turns the fluid approximately 180° may have a sufficiently large pressure effect in the counterbore of the inertia valve member 46 that the inertia valve will not open at the desired acceleration. In this embodiment, the turning vane is the lower surface of the rebound valve member 24. Fluid exiting the passages through the inertia valve retainer sleeve 47 impacts against the lower surface of the rebound valve member and is deflected approximately 90°. Wide cuts are made in the radially extending lip of the inertia valve retainer sleeve, approximating half of the circumference. The fluid flowing generally radially the turning vane must turn again to exit the counterbore of the inertia valve. This generates a pressure within the inertia valve counterbore which biases the inertia member downwardly and inhibits undesired opening of the inertia valve during body motion events. The magnitude of the force biasing the inertia valve toward a valve-closed position can be modified by changing the outside diameter of the turning vane as well as changing the angle of the lower surface of the turning vane. Generally speaking, the larger the diameter of the vane, the larger the force on the inertia member.

Figure 7:
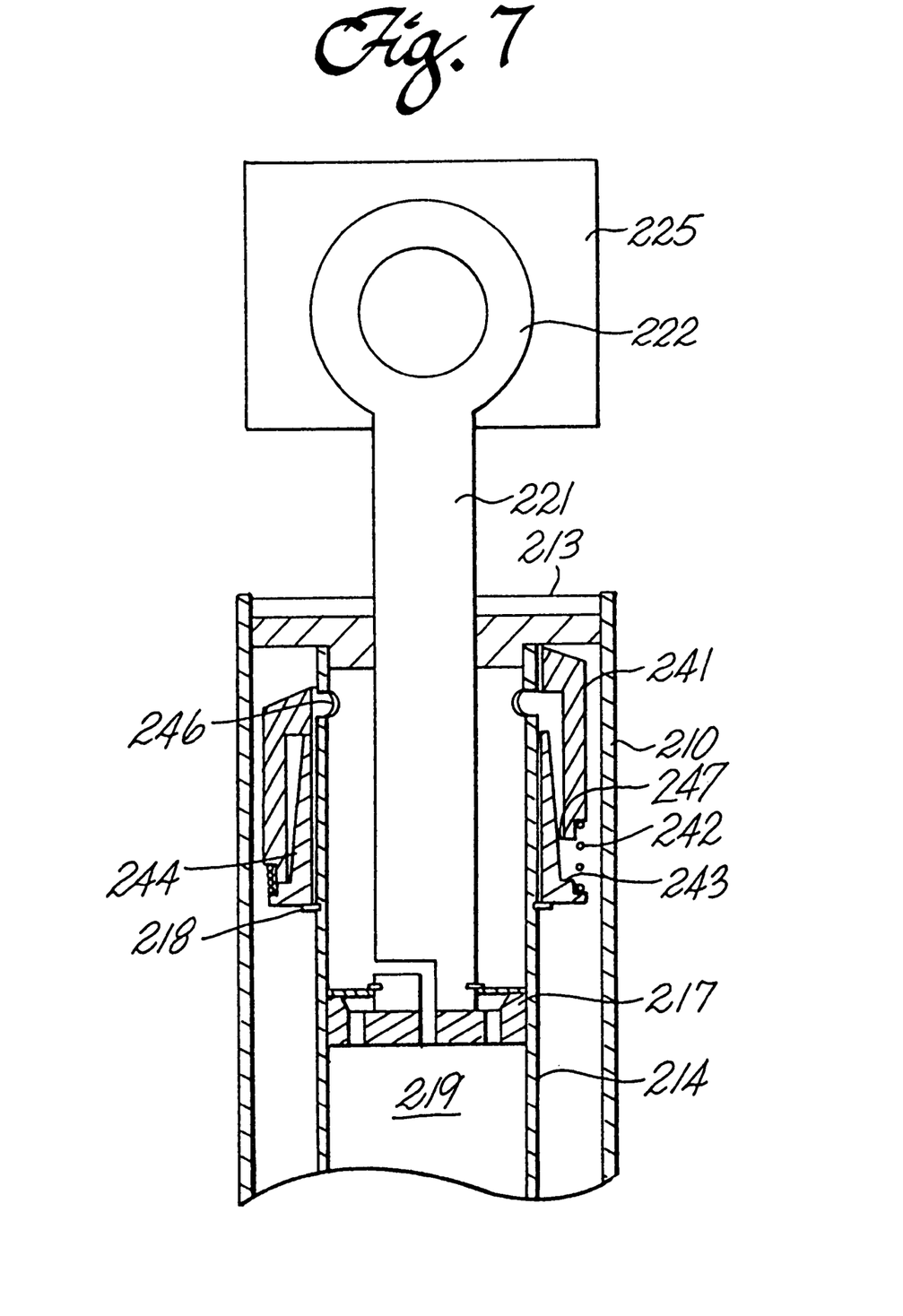
FIG. 7 is a fragmentary semi-schematic longitudinal cross-section of a twin tube shock absorber with a flow sensitive inertial mass.

FIG. 7 illustrates the upper end of a twin tube shock absorber. This embodiment illustrates fluid flow sensitivity employing the principle of a downstream restricted flow path smaller than a flow port for keeping an inertia valve open for a longer period. The shock absorber has an outer tube 210 sealed at its upper end by an upper end cap 213. An inner tube 214 is also sealed to the upper end cap. This defines an annular fluid reservoir 216 between the inner and outer tubes. A movable piston 217 is sealed in the inner tube, dividing its interior into an upper chamber 218 and a lower chamber 219. The piston is connected to a shaft 221 which extends through the upper end cap and terminates in a fitting 222 which is used for bolting the shaft to a vehicle chassis 225.

A rebound or extension acceleration sensitive valve is provided at the upper end of the inner tube for permitting fluid flow from the upper chamber 218 into the annular reservoir 216 in the event of rapid acceleration of the wheel downwardly. An axially movable upper sleeve 241 surrounds the inner tube near its upper end. The weight of the upper sleeve is supported by a low spring rate coil spring 242. The sleeve serves as an inertial mass for controlling the rebound valve. Ideally the spring is sufficiently stiff that it will support the entire weight of the inertial mass so that the inertial mass can displace more quickly. A fluid turning vane can also be incorporated into the twin tube shock absorber design to vector exiting fluid towards the inertial mass applying sufficient fluid force on the upper sleeve to maintain the sleeve in a valve-closed position during chassis motion events. Similarly, to minimize noise levels in the twin tube design, elastomeric buffers may be included and two stage port openings may be employed.

A number of embodiments of acceleration sensitive, fluid flow sensitive shock absorbers have been described and illustrated. It can be seen that variations are present in the relative dimensions and relationships of the various parts of the shock absorber. This variation is at least in part a consequence of different requirements for the shock absorbers for different vehicles. Even the front and back shock absorbers for a single vehicle are going to be "tuned" differently for optimum performance. Also, the embodiments described herein have been concerned with changing the damping characteristics upon wheel motion, particularly downward acceleration of the wheel. There are reasons for wishing to also change the performance characteristics of the shock absorber in response to upward wheel acceleration, or even to change in the event of body motions. Thus, equivalent structures and functions can be incorporated into shock absorbers for such service. Thus, it will be apparent that there are many additional modifications and variations that can be made in practice of this invention.

What is claimed is:

1. An acceleration sensitive shock absorber comprising:
   a tubular housing for connection to one portion of a vehicle;
   a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
   means for passing shock absorber fluid between the upper chamber and the lower chamber with a restricted flow rate during compression of the shock absorber;
   means for passing shock absorber fluid between the upper chamber and the lower chamber with a restricted flow rate during extension of the shock absorber;
   a port for providing an alternative fluid flow path during one of extension or compression of the shock absorber;
   a movable inertial mass in the shock absorber for opening the port during vertical acceleration of a portion of the shock absorber for increasing flow of fluid;
   means for biasing the inertial mass toward a port-opened position in response to fluid flow through the inertia valve after acceleration has decreased; and
   means for applying sufficient fluid force to the inertial mass for maintaining the inertial mass in a port-closed position during chassis motion events.

2. The shock absorber of claim 1 inertial mass is suspended in a substantially weightless condition further comprising a compression spring which is sufficiently strong to support all or substantially all of the weight of the inertial mass.

3. The shock absorber of claim 2 wherein the means for passing shock absorber fluid includes a rebound valve located on the piston rod above the piston, and the means for applying fluid force comprises a fluid turning vane positioned adjacent the rebound valve for directing fluid flowing through the rebound valve against a portion of the inertial mass.

4. The shock absorber of claim 3 wherein the fluid turning vane is stationary and the rebound valve is a deflected disk valve.

5. The shock of absorber of claim 3 wherein the fluid turning vane is movable and is integral with the rebound valve.

6. The shock absorber of claim 1 wherein the means for applying fluid force comprises a fluid turning vane for deflecting fluid at least partly toward the inertial mass.

7. The shock absorber of claim 1 further comprising a pressure relief system for reducing hydraulic force on the inertial mass as the inertial mass moves toward the port-open position.

8. The shock absorber of claim 7 wherein the pressure relief system comprises a passage through the piston extending from a pocket in the piston to the upper chamber, and a pressure relief valve positioned over the passage.

9. The shock absorber of claim 7 wherein the opening force of the relief valve is greater than the inertia valve opening force.

10. An acceleration sensitive shock absorber comprising:
    a tubular housing for connection to one portion of a vehicle;
    a piston assembly in the housing comprising a piston and a piston rod for connection to another portion of the vehicle, one of said portions being a chassis of the vehicle and the other portion being a wheel of the vehicle;
    means for passing shock absorber fluid between portions of the shock absorber through a restricted flow rate path during one of compression or extension of the shock absorber;
    an inertia valve in a first portion of the shock absorber for bypassing fluid flow past the restricted flow rate path;
    a movable inertial mass in the shock absorber for opening the inertia valve during acceleration of the first portion of the shock absorber for increasing bypass flow of fluid;
    a spring supporting all or substantially all of the weight of the inertial mass when the inertial mass is in a valve-closed position;
    means for biasing the inertial mass toward a valve-opened position in response to fluid flow through the inertia valve after acceleration has decreased; and
    means for directing sufficient fluid flow at least partially radially adjacent to the inertial mass for maintaining the inertial mass in the valve-closed position during motion of the second portion of the shock absorber.

11. A shock absorber according to claim 10 wherein the means for directing fluid flow comprises a fluid turning vane for deflecting fluid at least partly radially outwardly.

12. A shock absorber according to claim 11 further comprising a spring which is sufficiently strong to support the weight or substantially all of the weight of the inertial mass.

13. A shock absorber according to claim 11 wherein the fluid turning vane comprises a radially extending lip.

14. An acceleration sensitive shock absorber comprising:
    a tubular housing for connection to one portion of a vehicle;
    a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
    means for passing shock absorber fluid between the upper chamber and the lower chamber with a restricted flow rate during compression of the shock absorber;
    means for passing shock absorber fluid between the upper chamber and the lower chamber with a restricted flow rate during extension of the shock absorber;

a port for providing an alternative fluid flow path during one of extension or compression of the shock absorber;

a movable inertial mass suspended in the shock absorber for opening the port during downward acceleration of a portion of the shock absorber for increasing flow of fluid;

means for biasing the inertial mass toward a port-opened position in response to fluid flow through the inertia valve after acceleration has decreased; and means for directing fluid flow between the lower and upper chambers toward an upper portion of the inertial mass for biasing the inertial mass toward a port-closed position.

15. A shock absorber according to claim 14 wherein the means for directing fluid flow comprises a fluid turning vane for deflecting fluid at least partly radially outwardly.

16. A shock absorber according to claim 15 the inertial mass is suspended in a substantially weightless further comprising a spring which is sufficiently strong to support the weight or substantially all of the weight of the inertial mass.

17. A shock absorber according to claim 15 wherein the fluid turning vane comprises a radially extending lip.

18. A shock absorber according to claim 14 wherein the means for directing fluid flow comprises a fluid turning vane for deflecting fluid toward the inertial mass.

19. A shock absorber according to claim 18 further comprising a spring which is sufficiently strong to support all or substantially all of the weight of the inertial mass.

20. A shock absorber according to claim 14 wherein the fluid turning vane deflects fluid into a counterbore in the inertial mass.

21. An acceleration sensitive shock absorber comprising:

a tubular housing for connection to the chassis of a vehicle;

a piston assembly in the housing comprising a piston dividing the housing into an upper chamber and a lower chamber, and a piston rod for connection to a wheel of the vehicle;

a compression valve for passing shock absorber fluid through the piston with a restricted flow rate during compression of the shock absorber;

a rebound valve for passing shock absorber fluid through the piston with a restricted flow rate during extension of the shock absorber;

a port for providing an alternative fluid flow path during extension of the shock absorber;

a movable inertial mass mounted on the piston assembly for opening the port during downward acceleration of the piston for increasing flow of fluid through the piston; and a fluid turning vane for directing fluid flow from the rebound valve at least partially toward the inertial mass for biasing the inertial mass toward a port-closed position.

22. A shock absorber according to claim 20 wherein the fluid turning vane deflects fluid into a counterbore in the inertial mass.

23. An acceleration sensitive shock absorber comprising:

a tubular housing for connection to the chassis of a vehicle;

a piston assembly in the housing comprising a piston dividing the housing into an upper chamber and a lower chamber, and a piston rod for connection to a wheel of the vehicle;

a compression valve for passing shock absorber fluid through the piston with a restricted flow rate during compression of the shock absorber;

a rebound valve for passing shock absorber fluid through the piston with a restricted flow rate during extension of the shock absorber;

a first stage relatively smaller port and a second stage relatively larger port for providing an alternative fluid flow path during extension of the shock absorber;

a movable inertial mass mounted on the piston assembly for opening the first stage port upon lesser acceleration of the piston and opening the second stage port upon greater acceleration of the piston.

24. An acceleration sensitive shock absorber according to claim 23 comprising a pocket communicating with the ports and adjacent to the inertial mass and a flow restriction downstream from the pocket, the flow area of the first stage port being less than the flow area of the flow restriction and the flow area of the second stage port being greater than the flow area of the flow restriction.

25. An acceleration sensitive shock absorber according to claim 24 comprising a flow restriction downstream from the ports having a flow area which changes as a function of changes in position of the inertial mass.

26. An acceleration sensitive shock absorber comprising:

a tubular housing for connection to one portion of a vehicle;

a piston assembly in the housing, comprising a piston dividing the housing into an upper chamber and a lower chamber, and a piston rod for a connection to another portion of the vehicle, one of the portions being the chassis of the vehicle and the other portion being a wheel of the vehicle;

means for passing shock absorber fluid between the upper chamber and the lower chamber;

a port for providing fluid flow between the lower chamber and the upper chamber;

a movable inertial mass in the shock absorber for opening the port during acceleration of the wheel of the vehicle for increasing flow of fluid between the upper chamber and the lower chamber; and a pressure relief between the port and the inertial mass for minimizing mechanical noise when the inertial mass moves between port-open and port-closed positions.

27. An acceleration sensitive shock absorber according to claim 26 further comprising an elastomeric buffer adjacent to an end of the stroke of the inertial mass between the port-open and port-closed positions.

28. An acceleration sensitive shock absorber according to claim 27 wherein the elastomeric buffer is adjacent to the piston when the piston is in the port-open position.

29. An acceleration sensitive shock absorber comprising:

a tubular housing for connection to the chassis of a vehicle;

a piston assembly in the housing comprising a piston dividing the housing into an upper chamber and a lower chamber, and a piston rod for connection to a wheel of the vehicle;

a rebound valve for passing shock absorber fluid through the piston with a restricted flow rate during extension of the shock absorber;

a movable inertial mass mounted on the piston assembly for moving between a port-closed position at one end of its stroke and a port-open position at the other end of its stroke during acceleration of the piston; and a first stage port relatively nearer the port-closed position of the inertial mass and having a relatively smaller flow area, and a second stage port relatively further from the port-closed position and having a relatively larger flow area for providing an alternative fluid flow path during extension of the shock absorber.

30. An acceleration sensitive shock absorber according to claim 29 wherein movement of the inertial mass from the port-closed position toward the port-open position opens the first stage port before opening the second stage port.

31. An acceleration sensitive shock absorber according to claim 29 comprising a flow restriction downstream from the ports having a flow area which changes with changes in position of the inertial mass.

32. An acceleration sensitive shock absorber comprising:
a tubular housing for connection to the chassis of a vehicle;
a piston assembly in the housing comprising a piston dividing the housing into an upper chamber and a lower chamber, and a piston rod for connection to a wheel of the vehicle;
a rebound valve for passing shock absorber fluid through the piston with a restricted flow rate during extension of the shock absorber;
a movable inertial mass mounted on the piston assembly for moving between a port-closed position and a port-open position during acceleration of the piston;
a first stage port relatively nearer the port-closed position of the inertial mass and a second stare Port relatively further from the port-closed position for providing an alternative fluid flow path during extension of the shock absorber;
a pocket communicating with the ports and adjacent to the inertial mass; and
a flow restriction downstream from the pocket, the flow area of the first stage port being less than the flow area of the flow restriction and the flow area of the second stage port being greater than the flow area of the flow restriction.

33. An acceleration sensitive shock absorber comprising:
a tubular housing for connection to the chassis of a vehicle;
a piston assembly in the housing comprising a piston dividing the housing into an upper chamber and a lower chamber, and a piston rod for connection to a wheel of the vehicle;
a rebound valve for passing shock absorber fluid through the piston with a restricted flow rate during extension of the shock absorber;
a port for providing an alternative fluid flow path between the lower and upper chambers during extension of the shock absorber;
a movable inertial mass mounted on the piston assembly for opening the port during downward acceleration of the piston for increasing flow of fluid through the piston; and
an elastomeric buffer mounted in a dovetail groove on an end facing portion of the inertial mass for minimizing direct metal-to-metal contact of the end facing portion of the inertial mass with adjacent portions of the piston assembly.

34. An acceleration sensitive shock absorber comprising:
a tubular housing for connection to one portion of a vehicle;
a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
means for passing shock absorber fluid between the upper chamber and the lower chamber with a restricted flow rate during compression of the shock absorber;
a rebound valve located on the piston rod above the piston for passing shock absorber fluid between the upper chamber and the lower chamber with a restricted flow rate during extension of the shock absorber;
a port for providing an alternative fluid flow path during one of extension or compression of the shock absorber;
a movable inertial mass in the shock absorber for opening the port during vertical acceleration of a portion of the shock absorber for increasing flow of fluid; and
a fluid turning vane positioned adjacent the rebound valve for applying sufficient fluid force to the inertial mass for maintaining the inertial mass in a port-closed position during chassis motion events.

35. An acceleration sensitive shock absorber comprising:
a tubular housing for connection to one portion of a vehicle;
a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
means for passing shock absorber fluid between the upper chamber and the lower chamber with a restricted flow rate during compression of the shock absorber;
means for passing shock absorber fluid between the upper chamber and the lower chamber with a restricted flow rate during extension of the shock absorber;
a port for providing an alternative fluid flow path during one of extension or compression of the shock absorber;
a fluid flow valve comprising a movable inertial mass on the piston for opening the port during vertical acceleration of a portion of the shock absorber for increasing flow of fluid; and
a fluid turning vane positioned adjacent the fluid flow valve for applying sufficient fluid force to the inertial mass for maintaining the inertial mass in a port-closed position during chassis motion events.

36. An acceleration sensitive shock absorber comprising:
a tubular housing for connection to one portion of a vehicle;
a piston assembly in the housing comprising a piston and a piston rod for connection to another portion of the vehicle, one of said portions being a chassis of the vehicle and the other portion being a wheel of the vehicle;
means for passing shock absorber fluid between portions of the shock absorber through a restricted flow rate path during one of compression or extension of the shock absorber;
an inertia valve in a first portion of the shock absorber for bypassing fluid flow past the restricted flow rate path;
a movable inertial mass in the shock absorber for opening the inertia valve during acceleration of the first portion of the shock absorber for increasing bypass flow of fluid;
a spring supporting all or substantially all of the weight of the inertial mass when the inertial mass is in a valve-closed position; and a radially extending lip having a plurality of cuts through the radially extending lip for directing sufficient fluid flow at least partially radially outwardly adjacent to the inertial mass for maintaining the inertial mass in the valve-closed position during motion of the second portion of the shock absorber.

37. An acceleration sensitive shock absorber comprising:

a tubular housing for connection to one portion of a vehicle;

a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;

means for passing shock absorber fluid between the upper chamber and the lower chamber with a restricted flow rate during compression of the shock absorber;

means for passing shock absorber fluid between the upper chamber and the lower chamber with a restricted flow rate during extension of the shock absorber;

a port for providing an alternative fluid flow path during one of extension or compression of the shock absorber;

a movable inertial mass suspended in the shock absorber for opening the port during downward acceleration of a portion of the shock absorber for increasing flow of fluid; and a radially extending lip having a plurality of cuts through the radially extending lip for directing fluid flow toward an upper portion of the inertial mass for biasing the inertial mass toward a port-closed position.

38. An acceleration sensitive shock absorber comprising:

a tubular housing for connection to one portion of a vehicle;

a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;

means for passing shock absorber fluid between the upper chamber and the lower chamber with a restricted flow rate during compression of the shock absorber;

means for passing shock absorber fluid between the upper chamber and the lower chamber with a restricted flow rate during extension of the shock absorber;

a port for providing an alternative fluid flow path during one of extension or compression of the shock absorber;

a movable inertial mass in the shock absorber for opening the port during vertical acceleration of a portion of the shock absorber for increasing flow of fluid; and a radially extending fluid deflecting vane associated with one of the means for passing shock absorber fluid for deflecting fluid flowing through said means for passing shock absorber fluid at least partially radially and toward the inertial mass.

39. The shock absorber of claim 38 further comprising a compression spring which is sufficiently strong to support the weight or substantially all of the weight of the inertial mass.

40. A shock absorber according to claim 38 wherein the fluid deflecting vane comprises a radially extending lip.

* * * * *

UNITED STATES PATENT AND TRADEMARK OFFICE
CERTIFICATE OF CORRECTION

PATENT NO. : 5,954,167
DATED : September 21, 1999
INVENTOR(S) : Donald G. Richardson; David A. Shirley Page 1 of 1

It is certified that error appears in the above-identified patent and that said Letters Patent is hereby corrected as shown below:

Column 13,
Lines 50-51, after "claim 1" delete "inertial mass is suspended in a substantially weightless condition".

Column 15,
Lines 17-18, after "claim 15" delete "the inertial mass is suspended in a substantially weightless".
Line 58, replace "claim 20" with -- claim 21 --.

Column 17,
Line 29, replace "stare Port" with -- stage port --.

Signed and Sealed this

Sixteenth Day of October, 2001

Attest:

NICHOLAS P. GODICI
Attesting Officer
Acting Director of the United States Patent and Trademark Office